(12) United States Patent
Bauchot et al.

(10) Patent No.: US 11,221,729 B1
(45) Date of Patent: Jan. 11, 2022

(54) TRACKING AND RESTORING POINTER POSITIONS AMONG APPLICATIONS

(71) Applicant: International Business Machines Corporation, Armonk, NY (US)

(72) Inventors: Frederic Bauchot, la Tourraque (FR); Joel Viale, Vence (FR); Zsolt Szalai, Tourrettes-sur-Loup (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/085,469

(22) Filed: Oct. 30, 2020

(51) Int. Cl.
| | | |
|---|---|---|
| *G06F 3/048* | (2013.01) | |
| *G06F 3/0481* | (2013.01) | |
| *G06F 9/451* | (2018.01) | |
| *G06F 3/0484* | (2013.01) | |
| *G06F 3/0489* | (2013.01) | |

(52) U.S. Cl.
CPC .......... *G06F 3/0481* (2013.01); *G06F 3/0484* (2013.01); *G06F 3/0489* (2013.01); *G06F 9/451* (2018.02)

(58) Field of Classification Search
None
See application file for complete search history.

(56) References Cited

U.S. PATENT DOCUMENTS

| | | | | |
|---|---|---|---|---|
| 5,586,243 A * | 12/1996 | Barber | ............. | G06F 3/038 715/856 |
| 2006/0143571 A1* | 6/2006 | Chan | ............. | G06F 3/0481 715/764 |
| 2008/0115078 A1* | 5/2008 | Girgaonkar | ......... | G06F 3/04886 715/773 |

FOREIGN PATENT DOCUMENTS

| | | |
|---|---|---|
| CN | 106775187 A | 5/2017 |
| EP | 0467720 B1 | 9/1999 |
| JP | 5781742 B2 | 9/2015 |

OTHER PUBLICATIONS

"Freezing Dynamic User Interfaces During Input", IP.com No. IPCOM000145850D, IP.com Electronic Publication Date: Jan. 30, 2007, 5 pps., <https://priorart.ip.com/IPCOM/000145850>.

(Continued)

*Primary Examiner* — Thanh T Vu

(74) *Attorney, Agent, or Firm* — William H. Hartwell; Daniel R. Simek

(57) ABSTRACT

A method for restoring a pointer position within an application in response to a user switching between applications. The method includes one or more computer processors identifying a set of applications executing on a computing device of a user. The method further includes determining a series of pointer positions within a graphical user interface (GUI) of a first application of the set of executing applications in response to the user interfacing with the first application. The method further includes determining that the user pauses interfacing with a second application and resumes accessing the first application. The method further includes determining a pointer position from among the series of pointer positions respectively associated with the GUI of the first application. The method further includes responding to determining that the user resumes accessing the first application by positioning the pointer within the GUI of the first application at the determined pointer position.

20 Claims, 4 Drawing Sheets

(56) References Cited

OTHER PUBLICATIONS

"Pointer Lock API", MDN web docs, 11 pps, May 26, 2020, <https://developer.mozilla.org/en-US/docs/Web/API/Pointer_Lock_API>.

"Windows Multipoint Mouse", From Wikipedia, the free encyclopedia, last edited on Apr. 11, 2020, 2 pps., <https://en.wikipedia.org/wiki/Windows_Multipoint_Mouse>.

* cited by examiner

TRACKING AND RESTORING POINTER POSITIONS AMONG APPLICATIONS

BACKGROUND OF THE INVENTION

The present invention relates generally to the field of graphical user interfaces (GUIs), and more particularly to controlling the location of a pointer in response a user switching between applications.

Various operating systems (OSs) of computing devices, such as desktop computers, laptop computers, large systems, mobile devices, cell phones, etc., utilize graphical user interfaces (GUIs) to enable a user to interact with functions of the computing device and applications that execute on the computing device. For example, icons displayed within an OS GUI, and respectively associated with installed applications, can activate an application in response to a user selecting the icon corresponding to the application via a pointing device.

In addition, a GUI of an OS can also support the generation of other GUIs respectively associated with executing applications installed on a computing device and/or GUI elements associated various functions. A user may utilize an input/output (I/O) device, such as mouse or touch screen that navigates around the OS and application GUIs. For example, the interface element can be visually depicted as an arrow that enables the user interact with various elements of an application, such as activating pull-down menus; rearranging an order of tabs related to a set of functions; selecting an element (e.g., text, an Internet link, a picture, etc.) within an application associated with a subsequent action, such as copy or delete; etc. In addition, a web browser may include nested GUIs and GUI elements, such as a set tabs corresponding to each active Internet link of a web browsing session, frames within a webpage that display content of Internet links different from main link related to a web browser tab, and WUI (web-user interfaces) of applications that are accessible via the Internet.

SUMMARY

According to an aspect of the present invention, there is a method, computer program product, and/or computer system for restoring a pointer position within an application in response to a user switching between applications. In an embodiment, the method includes at least one computer processor identifying, by one or more computer processors, a set of applications executing on a computing device of a user. The method further includes at least one computer processor determining a series of pointer positions within a graphical user interface (GUI) of a first application of the set of executing applications in response to the user interfacing with the first application. The method further includes at least one computer processor determining that the user pauses interfacing with a second application and resumes accessing the first application. The method further includes at least one computer processor determining a pointer position from among the series of pointer positions respectively associated with the GUI of the first application. The method further includes at least one computer processor responding to determining that the user resumes accessing the first application, by positioning the pointer within the GUI of the first application at the determined pointer position.

DETAILED DESCRIPTION

Figure 1:
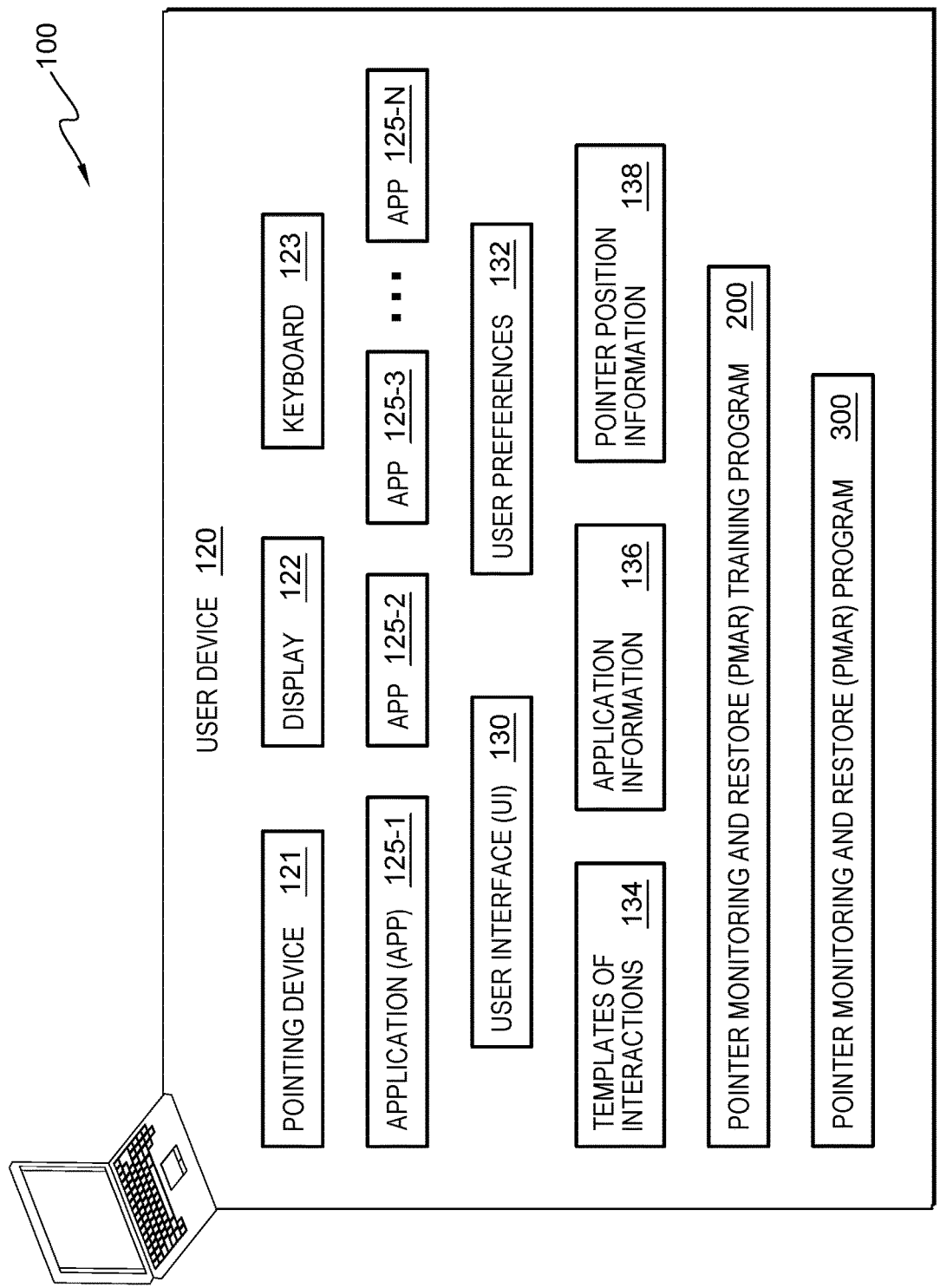
FIG. 1 illustrates a computing device environment, in accordance with an embodiment of the present invention.

Embodiments of the present invention recognize that advances in operating systems (OSs) enable users to execute multiple applications and/or system functions at the same time and have other application and/or functions active in the background while not in use. Embodiments of the present invention recognize that many OSs utilize graphical user interfaces (GUIs) to enable a user to interface with functions of an OS, execute a plurality of applications, and/or utilize embedded features of an application. In addition, embodiments of the present invention recognize a user utilizes one or more pointing devices, such as a mouse, a track-ball, and/or another interface, such as a touchscreen to control movement of a pointer element or pointer icon, such as an arrow, a cross, a pointing hand, etc., (hereinafter referred to as a pointer) within a GUI and execute one or more actions related to the position of the pointer.

Embodiments of the present invention also recognize that based on technology advancements that the display/interface areas among computing devices can be drastically different. In one example, a GUI area of a smartphone may be a few square inches, whereas the GUI environment associated with a medical system or a manufacturing environment can be distributed among a bank (e.g., a plurality) of displays can cover multiple square feet. In addition, a large GUI area enables a user to see and interact with a plurality of executing applications, whereas the limited GUI area of a smartphone dictates that the user scrolls between applications (apps) that are not visible and may be quiesced in the background of the OS. Further, embodiments of the present invention recognize that some legacy application may not integrate with other applications, or a legacy application may be limited (i.e., constrained) with respect to how an OS displays the GUI of the legacy application, such as full screen mode only.

Embodiments of the present invention recognize that based on the available GUI area and the number and types of executing apps that there are limits to what is both visible and intelligible to the user. Embodiments of the present invention also recognize that users can multi-task and/or a task may require a user to obtain information from a plurality of sources accessible via different apps. As such, the position of a pointer is constantly changing, and a user may forget where the user was working in one or more apps in response to switching between apps. As used herein app and application are used interchangeably. In an example, app "A" (e.g., a map program) is not integrated with other applications and presents a GUI where the pointer position allows displaying relevant information that may advantageously accessed and input to app "B." A user needs to display both apps "A" and "B" on a screen, and repeatedly swaps between apps "A" and "B" to first get information from an indicated position (e.g., an area of a map) displayed within the GUI of app "A" that can be then input to app "B." Subsequently, the user return to app "A" to explore another position close to the previous position, such as while exploring a series of points along a curve, a linear asset, a path, etc.

The problem is that in some instances accessing apps "A" and "B," and navigating the GUI of app "B" is done via pointer moves, losing of previous position in app "A."

Embodiments of present invention recognize that solutions like robotic process automation (RPA) are not well suited for addressing the above problem as the logic for tracking and capturing a series of points in application "A" may greatly vary, depending on contexts, information, and user habits. Further, if three or more applications are accessed, RPA is too restrictive with respect to increasingly complex interactions.

One embodiment of the present invention is implemented as a Finite State Machine (FSM) that tracks a sequence of events that matches a predefined template of interactions. For example, an embodiment of the present invention identifies that a user repeatedly moving or swapping between a pair of applications. The user utilizes a pointing device to move the pointer close to a prior "still" position within a first application (app), such as in insertion point or a highlighted item after utilizing a second application. In some scenarios, a "still" position of a pointer can also refer to a position within an app GUI where the pointer is stationary or moves less than a threshold value for greater than a dictated a dwell time (e.g., temporal) value.

Subsequently, an embodiment of the present invention determines that a user forms (e.g., creates) a template of interactions between a first app and a second app in response to determining that a quantity of user interactions between the first app and the second app exceeds another threshold value. In response, an embodiment of the present invention sets, memorizes, and/or defines a restore position for a pointer within at least the first app of a group of apps. Another aspect of the present invention can potentially set another pointer restore position within the second app responsive to determining that the user moves the pointer to a position within the second app that is within a threshold of the previous pointer position within the second app prior to resuming interfacing with the first app.

Some embodiments of the present invention can detect a user accessing apps within sub-GUIs or nested GUIs, such as web browser tabs or a web-user interfaces (WUIs) generated by an applications executing external to a device of a user, such as an app accessible via the Internet. In addition, embodiments of the present invention can also include apps detected within sub-GUIs, nested GUIs, and/or WUIs within one or more templates of interactions among apps that a user accesses. Other embodiments of the present invention are implemented within network-accessible GUI environments, such as a Desktop-as-a-service environment or a Virtual Desktop Infrastructure (VDI); and/or among user device GUIs and network-accessible GUI environments.

Another embodiment of present invention utilizes user inputs to define the beginning of a template of interactions among two or more apps and to track the pointer movements and user actions among a dictated template of applications (e.g., a predefined configuration). In addition, user inputs and/or preferences can dictate how and when a pointer restore position is defined or determined. Alternatively, or in addition to, a user can define keyboard shortcuts that access (e.g., switch, toggle) specific app of a set of executing apps associated with a template of interactions, or a keyboard shortcut that cycles among apps as opposed to determining that pointer movements indicate exiting one app and moving toward another app.

Other embodiments of the present invention utilize more complex criteria and analyses, such as a graph analysis to determine and identify a template of interactions or a group of templates of interactions from among a set of executing applications. Subsequently, a decision tree or other technique is utilized to select a specific template of interactions from among a two or more of templates of interaction associated with a set of executing applications. Various embodiments of the present invention can combine information from a plurality of sessions of computing device used by a user to determine one or more templates of interactions among apps.

Further embodiments of the present invention determine state data corresponding to each execution application among a set applications and/or template of interactions. State data corresponding to an application GUI, such as a location and a size within an OS GUI is utilized to determine compensated (e.g., alternative) restore positions for a pointer in response to one or more changes to an OS GUI (e.g., display area). In one example, OS GUI state data changes in response to adding or removing a display that affects the GUIs corresponding to executing applications (e.g., a size change, a location change, automatically minimizing an application GUI, etc.). In another example, state data corresponding to a GUI of an executing application is affected by a viewing orientation change, such as rotating a smartphone or tablet computer; closing one or more applications; executing one or more other applications; etc.

Similarly, further embodiments of the present invention can also determine compensated restore positions for the pointer within one or more executing applications responsive to determining one or more changes to state data related to an application GUI. In a further example, state data related to an application GUI can include a size change corresponding the application GUI, an aspect ratio change, a view orientation change, a change to a zoom level, moving the application GUI within the OS GUI, etc. For example, state data is collected to determine a compensated pointer position in response to one or more app or OS GUI changes. Other state data related to an application can include metadata related to a GUI element respectively associated with a particular position and event associated with a pointer, such as information associated with a mouseover, a mouse hover, or hover box (e.g., a graphical control element) that is activated while the user moves or hovers the pointer over a trigger area of a GUI.

The descriptions of the various scenarios, instances, and examples related to the present invention have been presented for purposes of illustration but are not intended to be exhaustive or limited to the embodiments disclosed.

The present invention will now be described in detail with reference to the Figures. FIG. 1 is a functional block diagram illustrating computing environment 100, in accordance with embodiments of the present invention. In one embodiment, computing environment 100 includes user device 120. User device 120 may represent a computing device of a user, such as a laptop computer, a tablet computer, a netbook computer, a personal computer, a desktop computer, a personal digital assistant (PDA), a smart phone, a wearable devices (e.g., smart glasses, smart watches, e-textiles, AR headsets, etc.), or any programmable computer systems known in the art. User device 120 may include components, as depicted and described in further detail with respect to FIG. 4, in accordance with embodiments of the present invention.

In another embodiment, if user device 120 of computing environment 100 lacks sufficient hardware resource to perform some functions related to the present invention, then one or more programs and/or files of user device 120 can be hosted by an Internet-accessible application or service (not shown), such as a cloud computing system. In a further embodiment, one or more aspects of computing environment 100 are associated with a Desktop-as-a-service environment or a Virtual Desktop Infrastructure (VDI) accessible via a network (not shown).

In an embodiment, user device 120 includes pointing device 121, display 122, keyboard 123, application (app) 125-1, app 125-2, app 125-3 through app 125-N, user interface (UI) 130, user preferences 132, templates of interaction 134, application information 136, pointer position information 138, pointer monitoring and restore (PMAR) training program 200, pointer monitoring and restore (PMAR) program 300, and other programs and data (not shown). Examples of other programs and data may include an operating system (OS), a productivity suite, a calendar function, a wireless communication program, a web browser, a media gallery program, documents, data files, etc. In various embodiments, the OS and applications of user device 120 generate respective GUIs (not shown).

In another embodiment, one or more hardware elements of user device 120 (described hereinafter) are external to user device 120 but operatively coupled to user device 120. As used herein, operatively coupled may refer to a physical connection or a wireless connection. In some embodiments, device 120 includes two or more instances of a hardware element, such as a wireless mouse and a touchpad (i.e., instances of pointing device 121); an embedded touchscreen and an external monitor connected to a laptop computer; and/or two dual-output graphics cards (not shown) wired to a bank of four monitors (i.e., instances of display 122).

In an embodiment, pointing device 121 controls the movement of a pointer or icon, such as an arrow, a cross, a pointing hand, etc., within a GUI (e.g., an OS or an application GUI) and/or UI 130. Pointing device 121 can execute one or more actions related to the position of the pointer, such as opening a menu; scrolling through a menu; highlighting displayed content (e.g., text, graphics, etc.); setting an insertion point; executing a function, such as copy or delete to a selected item of content, etc. In some embodiments, pointing device 121 is a hardware element operatively coupled but external to user device 120, such as a mouse, a trackball, a graphics tablet, etc. In other embodiments, pointing device 121 is an electronic device included within user device 120, such as a touchpad or a pointing stick with function buttons.

In other embodiments, pointing device 121 is operationally included within another hardware element, such as a touch screen (i.e., an instance of display 122) that performs both input functions and output/display functions. In another embodiment, pointing device 121 is a virtual I/O device generated within computing environment 100 for presentation by an instance of display 122, such as smart glasses, a heads-up display, an augmented reality (AR) device or program, etc. A user of user device 120 may interface with a virtual instance of pointing device 121 via motion capture, finger tracking, eye tracking, a cyberglove, etc.

In an embodiment, one or more instances of display 122 presents (i.e., displays) aspects of the OS GUI of user device 120 and can also display the GUIs associated with one or more executing applications based on various factors, such as a display configuration, a display area size associated with instances of display 122, a number executing applications, and the respective sizes of the GUIs of executing applications that are presented to a user.

In one embodiment, display 122 is representative of a hardware element included within user device 120, such as a display of a laptop computer. In another embodiment, display 122 is representative of an external hardware element operatively coupled to user device 120, such as a monitor or smart TV. In various embodiments, display 122 is representative of a touchscreen display that includes other functionalities (previously discussed above with respect to point device 121). In some embodiments, instances of display 122 can be dynamically coupled or uncoupled to user device 120. In one example, docking a laptop computer (i.e., user device 120) to a docking station (not shown) connected to two instance of display 122 may expand the OS GUI area to utilize three different visual areas. In another example, disconnecting an external instance of display 122 from user device 120 may affect the one or more GUIs based on a change of display resolution.

In various embodiments, a user of user device 120 utilizes keyboard 123 to input predefined hot-key combinations (i.e., keyboard shortcuts) that affect PMAR training program 200, PMAR program 300, and/or UI 130. In one embodiment, keyboard 123 is a hardware element external to user device 120 but operatively coupled to user device 120. In some embodiments, keyboard 123 is a hardware element included within user device 120, such as the keyboard of a laptop computer. In other embodiments, keyboard 123 is a graphical interface of an OS GUI of user device 120 utilized by a user via a touchscreen instance of display 122.

In another embodiment, keyboard 123 is virtual I/O device generated within computing environment 100 for presentation by various instances of display 122, such as smart glasses, a heads-up display, an augmented reality (AR) device or program, etc. A user of user device 120 may interface with a virtual instance keyboard 123 via motion capture, finger tracking, eye tracking, a cyberglove, etc.

In one embodiment, app 125-1, app 125-2, app 125-3 through app 125-N are representative of computer programs or application installed on user device 120, such a word processing app, a calendar app, a presentation app, a spreadsheet app, a web browsing program, etc. In another embodiment, one or more apps of app 125-1, app 125-2, app 125-3 through app 125-N execute external to user device 120, such as web apps accessible via the Internet.

In various embodiments, each app of app 125-1, app 125-2, app 125-3 through app 125-N generates a respective application (app) GUI. A process ID (PID), metadata, and/or state data (described in further detail with respect to application information 136) can be respectively associated with an app. In an embodiment, a user of user device 120 interacts with a respective set of features and GUI elements of the executing instances of app 125-1, app 125-2, app 125-3 through app 125-N via pointing device 121, display 122, and/or keyboard 123. In addition, the user of user device 120 navigates among GUIs of executing apps utilizing pointing device 121 and/or switches between GUIs executing apps utilizing keyboard 123.

In one embodiment, UI 130 represents a user interface (UI) or GUI associated with PMAR training program 200 and PMAR program 300. A user of user device 120 utilizes UI 130 to populate various fields, and input or edit information within user preferences 132. In some embodiments, a user of user device 120 utilizes UI 130 to define, configure, view, edit, and/or delete a template of interactions within templates of interactions 134. In other embodiments, UI 130 enables a user to modify various identifications or determinations by PMAR training program 200 and/or PMAR program 300, such as excluding an application from pointer monitoring.

User preferences 132 includes information and rules utilized by PMAR training program 200 and/or PMAR program 300, such as hot-key combinations that activate PMAR training program 200; rules related to events that activate PMAR training program 200, PMAR program 300, and/or UI 130. Other information within user preferences 132 may include a value for the maximum number of applications that are included within a template of interactions, a value for the number of pointer positions within a series of pointer positions, a temporal value used to periodically determine a position of the pointer within an app GUI, proximity threshold values that trigger pointer position changes based on a position and/or a direction of motion of a pointer within an app GUI or pointer movements between app GUIs. In one example, user preferences 132 includes values used to identify a "still" position of a pointer within an app GUI, such as a duration that the pointer is stationary or that the pointer remains within a threshold area for greater than a dictated dwell time value. In addition, a user preference value can apply to a group of apps (e.g., a default value) or may be respectively associated with a given app.

In some embodiments, user preferences 132 also include other preferences related to identifying, configuring, and/or selecting a template of interactions of a user among two or more executing applications. In one example, user preferences 132 may dictate a threshold value for the number of swaps (e.g., alternates interfacing with) among two or more applications that indicates a template of interactions. In another example, user preferences 132 include analysis rules, such as utilizing decision trees to identify a template of interactions; rules related to determining a logical interaction among apps; identifying event driven interactions among apps; and/or combining information related to user interactions from a current session (e.g., activation) of user device 120 with one or more prior sessions of a user utilizing user device 120.

In one embodiment, user preferences 132 also includes a timeout value that terminates PMAR program 300 if a user does not resume a template of interactions within a dictated period of time, keyboard shortcuts (i.e., a hot-key combinations) utilized to switch to a particular app and to disable the activation of PMAR program 300 in response to prompting the user of user device 120 that the use has begun executing a known template of interactions. In various embodiments, user preferences 132 can dictate collecting metadata for one or more app GUIs, such as logging hover-over events, or state data for determining compensated pointer positions.

Templates of interactions 134 includes a list of groupings of two or more executing applications that a user utilizes in a particular a manner based on information determined by PMAR training program 200, defined in a configuration dictated by the user via UI 130, and/or edited by a user utilizing UI 130. In one embodiment, a template of interactions among executing applications may include a name corresponding to an executing app; metadata related to the executing app, such as a file or content source accessed by the application; one or more dictates, such as an indication of directionality (e.g., unidirectional or bi-directional) related to restoring pointer positions among two or more apps; a sequence or combination that the user utilizes apps of a group of apps; etc. In one example, templates of interactions 134 indicates a bi-directional interaction between app 125-1 and app 125-2 (e.g., pointer restore positions determined for both apps). In another example, templates of interactions 134 indicates a cyclical interaction among app 125-2, app 125-3, and app 125-N (e.g., a pointer restore position is determined for one app of a pair of apps). In a further embodiment, templates of interactions 134 can include templates of interactions that occur within sub-GUIs and/or GUIs of other environments.

In some embodiments, templates of interactions 134 can also include dictates and/or logical actions associated with one or more apps of a template of interactions. In one example, information from two or more applications is viewed or copied prior to accessing a common application, such as a spokes and hub analogy. One or more pointer positions within a respective "spoke" app are stored (e.g., remembered or frozen) as pointer restore positions, based on one or more preferences, but the "hub" app lacks a defined pointer restore position. In another example, the restore position within a second app can change from the previous restore position to an estimated or predicted restore position in response to identifying an event related to the first application, such as changing the restore position if a copy event is detected; but leaving the pointer restore position unaltered if a different event or action is identified, such as highlighting content, a change of font, etc.

Application information 136 includes information related to a plurality of applications (i.e., apps) that are respectively associated with one or more templates of interactions, such as initial state data corresponding to a GUI of an app. In various embodiments, some information related to an execution application can vary, such as a unique process ID (PID) assigned by the OS of user device 120 for each instance of an app and the PID is volatile (e.g., lost when application terminates, the OS of user device 120 restarts/shuts down), a pointer icon shape with an application during a give interaction, etc. In addition, application information 136 includes information utilized to map the location of app GUIs within the OS GUI, because app GUIs are not fixed and can be in differing locations for each activation (e.g., session) of user device 120.

In a further embodiment, application information 136 includes the state data related to one or more GUIs or apps, a display area of user device 120, metadata associate with an app or app GUI. In one example, state data may include or indicate a change of GUI size; a change to a location of a GUI of an app within the display area (e.g., moving a GUI, restoring a GUI from a minimized state, etc.); a change of zoom associated with the contents within an app GUI; changing parameters (e.g., margins, line spacing, font name, font size, etc.) that affect content displayed by an app, etc. In another example, metadata related to an app or app GUI may be related to content within an app, such as a size of an area of content that is added or removed within an app GUI; hover-over information corresponding to a pointer restore position within an app; a hover-over event trigger; etc. In other embodiments, application information 136 includes state data associated with one or more sub-GUIs; nested GUIs; and/or apps executing external to user device 120, such as a location of a webpage frame, a size allocated to a web browsing tab, state data associated with a WUI, etc.

In an embodiment, pointer position information 138 includes a plurality of series (e.g., ordered sets) of pointer positions related to an application GUI. Pointer position information 138 stores pointer positions captured by PMAR training program 200 and/or PMAR program 300 across one or more sessions of a user interfacing with user device 120. In some embodiments, pointer position information 138 also includes a plurality of pointer positions, pointer movement paths within GUIs, paths traversing an OS GUI, and sequences of interactions associated with a plurality of sessions of a user interfacing with user device 120 and further associated with sets of executing applications. A pointer position associated with a path may also include an indication of direction, an indication identifying a prior app, an indication identifying a subsequent app, and/or hot-key combinations related to accessing/swapping/switching to another apps.

In other embodiments, pointer position information 138 includes one or more additional indications related to a pointer position, such as the position is identified as a "still" position of the pointer; the pointer position is associated with a GUI event, such as a hover-over event or a position where a user-defined hot-key combination was executed; a content action was executed, such as copy action; a context menu was accessed (e.g., a right-click menu); a link was activated; etc. An additional indication related to a pointer position may be further mapped to state data and/or metadata stored within application information 136. In a further embodiment, responsive to identifying a change related to an app GUI, such as a state data change; a change to contents of an app; and/or a change to the OS GUI, one or more compensated pointer positions or series of compensated pointer positions are determined based on the identified changes.

In one embodiment, a user executes PMAR training program 200 to compile information utilized to determine a template of interactions between two or more executing applications by a user of user device 120. In another embodiments, PMAR training program 200 executes in the background of user device 120 to determine whether a sequence or a combination of interactions generated by a user utilizing user device 120 and two or more executing apps indicates a template of interactions by determining that the number of repeated interactions between at least two apps exceeds a threshold value. For example, PMAR training program 200 executes in an FSM mode. In some embodiments, PMAR program 300 calls PMAR training program 200 to determine whether a user generates a new template of interactions or modifies a known template of interactions.

In an embodiment, PMAR training program 200 monitors actions of a user interfacing with one or more apps, a plurality of movement corresponding to a pointer within an GUI of an app, and traversals among app GUIs, which collectively relate to a sequence of interactions during a session with user device 120. PMAR training program 200 can also monitor and capture (e.g., compile) interactions and pointer movements among sub-GUIs, nested GUIs, and WUIs in addition to the GUIs of the apps installed on user device 120. In response, PMAR training program 200 analyzes the various sequences and/or combinations of interactions to determine whether a user generates a template of interactions among two or more apps. In various embodiments, PMAR training program 200 can combine information from a plurality of sessions of a user utilizing user device 120 to determine one or more templates of interaction among the applications of user device 120.

PMAR program 300 restores a pointer to a position within a GUI of an app responsive to determining that a user resumes interfacing with the app after interfacing with one or more other apps based on a known template of interactions and a series of pointer positions determined while the user previously utilized the app. PMAR program 300 can determine that a user resumes interfacing with the app based on tracking the movement of a pointer among GUIs or identifying the execution of a keyboard shortcut utilized to access the app. In one scenario, PMAR program 300 automatically activates in response to a user utilizing user device 120. In response, UI 130 prompts the user to select to quiesce PMAR program 300 or to permit PMAR program 300 to execute. In some scenarios, PMAR program 300 executes in response to detecting that pre-defined criteria are met, such as determined that a defined set of apps are executed, or a period of time (e.g., calendar date range) associated with preparing an end-of-quarter presentation. In another scenario, a user commands PMAR program 300 to execute.

In various embodiments, PMAR program 300 monitors and tracks a plurality of actions and pointer movements of a user within and among GUIs of a plurality of executing apps. Subsequently, PMAR program 300 determines whether the user is interfacing with (e.g., utilizing) a group of two or more apps via template of interactions previously determined by PMAR training program 200. Responsive to determining that the user is interfacing with a group of two or more apps via a known template of interactions, PMAR program 300 determines a restore position for a pointer within at least on app. If the user resumes interfacing with an app that includes a determined restore position, then PMAR program 300 automatically moves the pointer of pointing device 121 to the determined restore position within the GUI of the app.

In some embodiments, PMAR program 300 determines state data corresponding to at least a group of apps, of the executing set of apps, that are associated with a template of interactions. PMAR program 300 utilizes state data to identify and locate the GUIs of app within the OS GUI and to determine whether pointer movements are directed toward or away from an app associated with a template of interactions. In a further embodiment, PMAR program 300 analyzes changes to state data associated with user device 120 and/or one or more apps, such as a change of area of display 122, a size change corresponding to a GUI of an app, etc., to determine a new (e.g., compensated) position utilized as the restore position for a pointer within the GUI.

Figure 2:
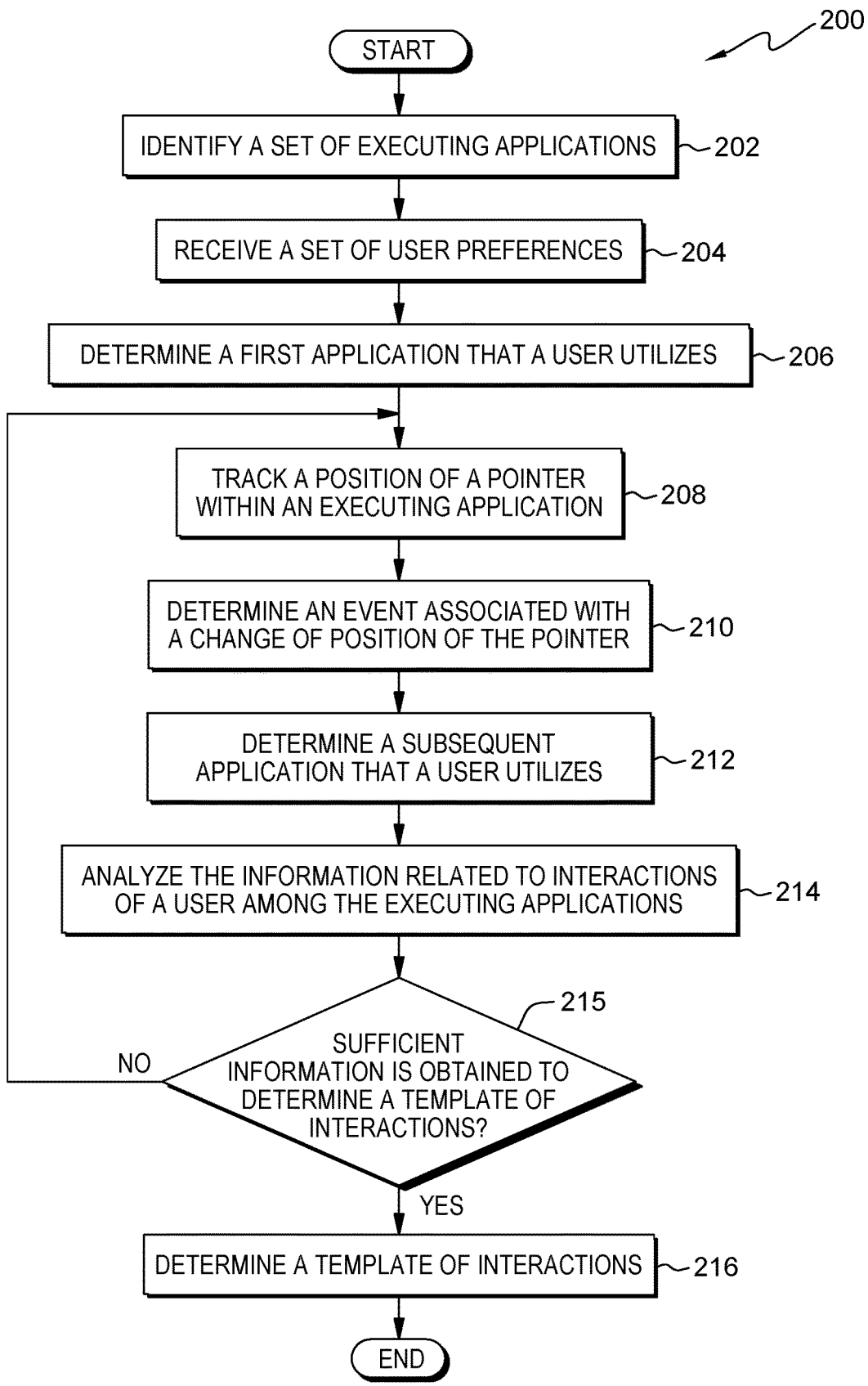
FIG. 2 depicts a flowchart of steps of a pointer monitoring and restoration training program, in accordance with an embodiment of the present invention.

FIG. 2 is a flowchart depicting operational steps for PMAR training program 200, a program for determining (e.g., generating) a template of user interactions among two or more executing applications based on activity and movements associated with a pointing device, in accordance with embodiments of the present invention. In one embodiment, a user initiates PMAR training program 200. In another embodiments, PMAR training program 200 executes in the background of user device 120. In some embodiments, PMAR training program 200 is called by PMAR program 300 to determine whether actions of a user among executing applications generate a new template of interactions or modify a known template of interactions.

In step 202, PMAR training program 200 identifies a set of executing applications. In one embodiment, PMAR training program 200 identifies a set of executing applications installed within user device 120 by interfacing the OS of user device 120. In another embodiment, PMAR training program 200 identifies one or more other executing network-accessible applications not installed within user device 120, such as by determining the properties of a task respectively associated with a web browser tab. In a further embodiment, PMAR training program 200 identifies one or more applications executing within another environment, such as a VDI. In various embodiments, PMAR training program 200 determines additional information related to the set of executing applications, such as state data and/or the different PIDs of instance of the same executing app and stores the additional information within application information 136.

In step 204, PMAR training program 200 receives a set of user preferences. In one embodiment, PMAR training program 200 presents UI 130 to a user to receive or modify a set of preferences within user preferences 132. In another embodiment, PMAR training program 200 loads a set of user preferences from user preferences 132. In some embodiments, PMAR program 200 utilizes information related to user device 120 to determine the set of user preferences to load. For example, PMAR training program 200 selects one set of user preferences based on the OS GUI area of display 122 and the respective GUI areas of identified set of apps. In other embodiments, PMAR training program 200 determines that a user preference dictates that a user can modify the identified set of executing application to exclude one or more executing apps from subsequent pointer monitoring and interaction analyses.

In step 206, PMAR training program 200 determines a first application that a user utilizes. In one embodiment, PMAR training program 200 determines a first app that a user of user device 120 utilizes (e.g., accesses) based on input received from the user, such as a selection from a list executing apps displayed via UI 130 or a hot-key combination executed within the GUI of an app. In another embodiment, PMAR training program 200 determines a first app that the user utilizes by detecting the first app GUI that the pointer enters, and that the user performs one or more actions within the app, such as adding/modifying content, copying content, etc.

In step 208, PMAR training program 200 tracks a position of a pointer within an executing application. PMAR training program 200 captures (e.g., stores) a series pointer positions associated with an app within pointer position information 138 based on one or more factors, such as a period of time, a user action, and/or identifying a "still" position of the pointer. In one embodiment, PMAR training program 200 captures the movement and activity of a pointer with respect to a first app, such as app 125-1. In another embodiment, PMAR training program 200 captures pointer positions with respect to a GUI of an app different from the first app, such as one or more subsequent apps. In other embodiments, PMAR training program 200 also obtains other information respectively associated with a pointer position, such as user actions, events, related metadata, etc. PMAR training program 200 stores the other obtained information respectively associated with a pointer position within application information 136.

In step 210, PMAR training program 200 determines an event associated with a change of position of the pointer. In one embodiment, PMAR training program 200 determines that a change of position of the pointer is related to the event of the pointer exiting (e.g., leaving or moving through a GUI edge) the GUI of one app and entering the GUI of the OS. In another embodiment, PMAR training program 200 determines an event associated with a change of position of the pointer is related to a hot-key combination that accesses another app. In some embodiments, PMAR training program 200 determines the event associated with a change of position of the pointer is based on minimizing the current app, such as responding to determining that the area of display 122 is constrained (e.g., limits the number of viewable app GUIs). In other embodiments, PMAR training program 200 determines that an event is further associated with manipulating, copying, and/or moving content from within an app.

In step 212, PMAR training program 200 determines a subsequent application that the user utilizes. In one embodiment, PMAR training program 200 determines a subsequent application that a user utilizes based on determining that the pointer traverses the OS GUI and enters (e.g., crosses the perimeter or boarder) the GUI of another executing app. In another embodiment, PMAR training program 200 determines a subsequent app that the user utilizes based on identifying the app accessed by a hot-key combination that the user executes.

In some embodiments, if PMAR training program 200 loops via the "No" branch of decision step 215, then the subsequent application can be the first app or another app. For example, if a user utilizes app 125-1 first, next the user utilizes app 125-3, and subsequently the user returns to app 125-1 after performing various actions within app 125-3, then PMAR training program 200 determines that app 125-1 is an app subsequent to app 125-3. PMAR training program 200 also determines the number of times each app is utilized or accessed and whether a different app is accessed before and/or after a given app.

Still referring to step 212, in various embodiments PMAR training program 200 also determines one or more pointer positions associated with traversing the OS GUI to access the subsequent app. In some scenarios, PMAR training program 200 generates a web or graph structure of user interactions and pointer positions (e.g., movements) with respect to the set of executing apps. In other scenarios, each execution of PMAR training program 200 (e.g., a session associated with user device 120) generates separate groups of paths of user interactions and pointer positions. PMAR training program 200 stores pointer movement paths, series of pointer positions, an order that apps are accessed, and related information as a sequence of interactions within pointer position information 138. PMAR training program 200 also includes information determined in step 208 and step 210 within a sequence and/or combination of interactions.

In step 214, PMAR training program 200 analyzes the information related to the interactions of a user among the executing applications. PMAR training program 200 utilizes various analysis techniques, such as statistical analysis, structural analysis, template matching, segmentation and classification, etc., to identify one or more sequences or structures among user interactions related to the set executing apps. In addition, PMAR training program 200 can utilize other information to augment identifying and generating a template of interactions, such as noting user actions, tracking the movement of content between apps, configuring a hot-key combination to access an app, etc.

In an embodiment, PMAR training program 200 utilizes various rules, criteria, preferences, etc., within user preferences 132 to determine whether the current sequence and/or combination of interactions of a user among the set of executing apps indicates one or more templates among the set of executing apps. A template of interactions refers to a group of two or more apps that a user utilizes based on at least a frequency of pointer movements between apps. In one example, if five different apps (not shown) executing on user device 120 are accessed by a user, but the number of swaps between any two apps is less than a threshold value, then PMAR training program 200 determines that sufficient information is not obtained to determine (e.g., generate) a template of interactions among the five apps. In another example, if user preferences 132 dictates determining a template of interactions among a group of three unspecified apps and the number of user accesses or swaps between two pairs of apps exceeds a threshold, but a third app is not common among any two pairs of apps, then PMAR train program 200 determines that sufficient information is not obtained to determine a template of interactions among a group of three apps based on the number of user accesses or swaps (e.g., interactions) among apps.

Still referring to step 214, in some embodiments, PMAR training program 200 accesses pointer position information 138 to obtain additional sequences and/or combinations of interactions from one or more prior executions of PMAR training program 200 (e.g., sessions) to determine whether sufficient information is available to determine a template of interactions among a dictated group of apps or a dictated number of apps. In one example, PMAR training program 200 utilizes a decision tree to determine the number of templates of interactions to potentially identify based on the number of previous sessions of information that are available within pointer position information 138 for a set of executing applications. In another example, PMAR training program 200 analyzes a number of sequences and/or combinations of interactions dictated by user preferences 132 to determine whether sufficient information is obtained to determine a template of interactions for a specified pairs of apps.

In decision step 215, PMAR training program 200 determines whether sufficient information is obtained to determine a template of interactions. In one embodiment, PMAR training program 200 determines that sufficient information is not obtained to determine a template of interactions if a subsequent app is accessed but pointer position information and/or user interactions are lacking for the subsequent app. In another embodiment, PMAR training program 200 determines that sufficient information is not obtained to determine a template of interactions based on analyses performed in step 214. In some embodiments, PMAR training program 200 determines that sufficient information is obtained to determine at least one template of interactions between two or more app based on analyses performed in step 214.

Responsive to determining that sufficient information is not obtained to determine a template of interactions (No branch, decision step 215), PMAR training program 200 loops to step 208 through step 214 to obtain additional information associated with one or more apps and to analyze the additional information.

Referring to decision step 215, in one embodiment responsive to determining that sufficient information is obtained to determine a template of interactions (Yes branch, decision step 215), PMAR training program 200 determines (e.g., generates) a template of interactions (step 216). In some embodiments, user preferences 132 dictates that two or more template of interactions are to be determined. If sufficient information is obtained to determine one template of interactions (Yes branch, decision step 215), then the current instance of PMAR training program 200 determines a template of interactions for one sequence and/or combination of interactions in step 216. Another instance of PMAR training program 200 loops via the No branch of decision step 215 to step 208 through step 214 to determine additional information related to one or more executing apps, such as pointer positions, events, and user interactions prior to determining at least a second template of interactions between a dictated number of apps.

In step 216, PMAR training program 200 determines a template of interactions. PMAR training program 200 stores a determined template of interactions within templates of interactions 134. In addition, PMAR training program 200 may, based on a user preference, activate UI 130 to present determined one or more templates of interactions to a user to accept, modify, or delete. In an embodiment, PMAR training program 200 determines (e.g., generates) a template of interactions between two app based on a determined sequence and/or combination of interactions and other previously determined information, such as events associated with pointer position change, user actions within an app, a direction of content movement between apps, etc. In some embodiments, PMAR training program 200 determines a template of interactions among a group of three or more apps, such as a shape of a combination of interactions between the apps of a group of app (e.g., circular, hub and spokes, a web, etc.), an order or a direction (e.g., unidirectional, bidirectional, etc.) of content-based user actions between at least two apps.

In various embodiments, PMAR training program 200 can also determine a potential pointer position or predict a next app utilized by a user based on the direction that the pointer exits a GUI of one app (e.g., crosses the boarder) and enters the OS GUI. State data corresponding to each app GUI can be utilized to map the positions of a set of apps within the OS GUI, thereby enabling a directional trigger to be set for two or more apps. In another embodiment, PMAR training program 200 further analyzes pointer positions movements between at least two apps to determine whether the template of interactions includes a user moving a pointer to another position (e.g., a predictable pointer restore position) within an app that is related to a prior pointer position within the app. For example, PMAR training program 200 may determine that when the user resumes accessing the app, that the user moves the pointer to a position related to a content-based event, such as at the beginning of a section of copied content, or the end of a section of pasted content.

Figure 3:
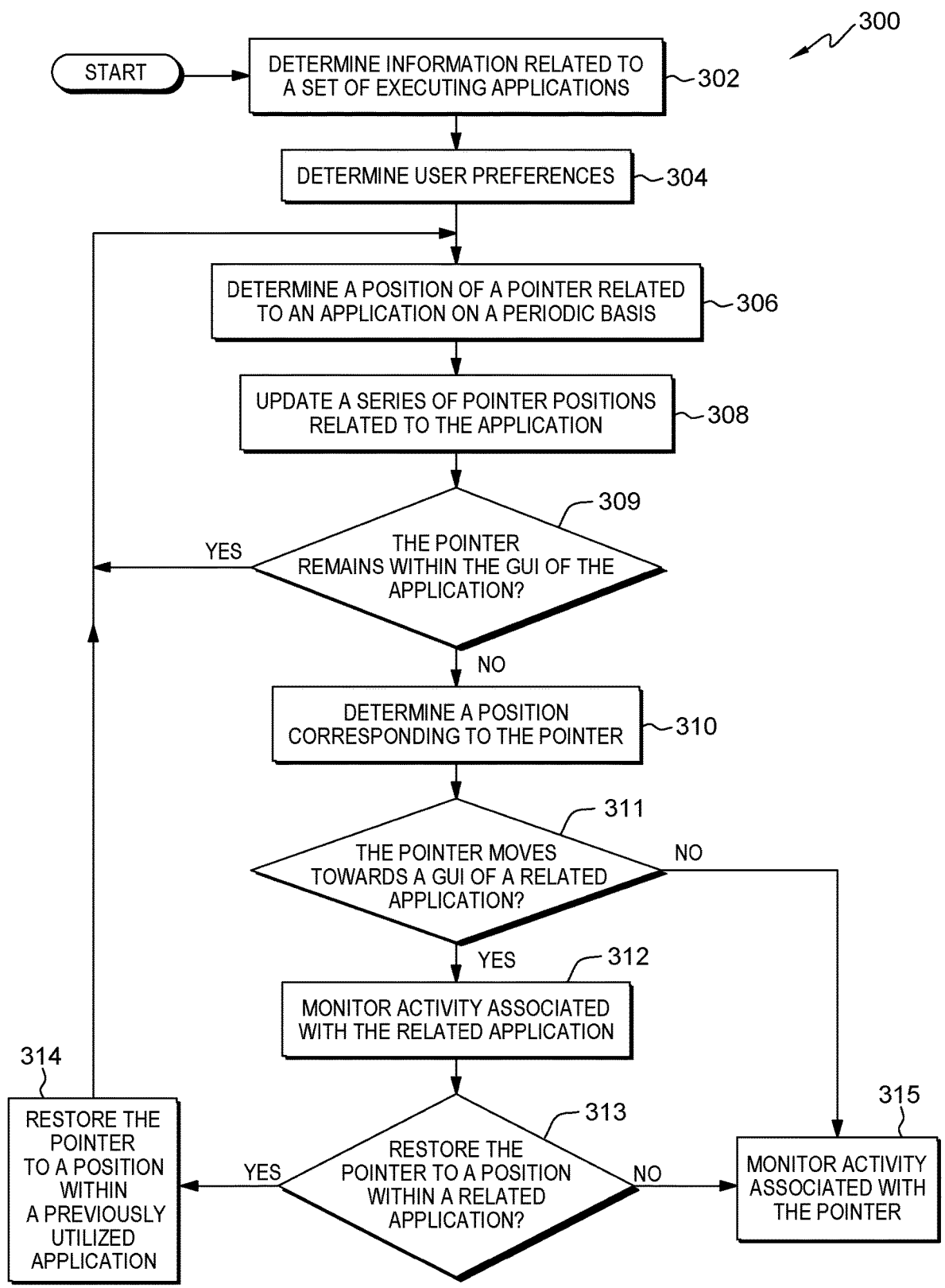
FIG. 3 depicts a flowchart of steps of a pointer monitoring and restoration program, in accordance with an embodiment of the present invention.

FIG. 3 is a flowchart depicting operational steps for PMAR program 300, a program that restores a pointer to a position within a GUI of a previously utilized app in response to determining that a user resumes interfacing with the app after interfacing with one or more other apps, in accordance with embodiments of the present invention. In some embodiments, PMAR program 300 determines that the user performs actions that are different from a known template of interactions, in response PMAR program 300 executes PMAR training program 200 to determine whether a user is generating a new template of interactions or modifying a known template of interactions.

In step 302, PMAR program 300 determines information related to a set of executing applications. PMAR program 300 identifies a set of applications executing on user device 120 based on various methods previously discussed with respect to step 202 of PMAR training program 200. In various embodiments, PMAR program 300 interfaces with the OS (not shown) of user device 120 to determine information related to a set of executing applications. PMAR program 300 stores the determined information related to a set of executing applications within application information 136. Information related to a set of executing applications may include a PID corresponding to each instance of an app that is executing, state information respectively associated with a GUI of each instance of an app that is executing, metadata related to an executing app, etc. Examples of metadata related to an executing app may include a name and/or directory location of a file utilized by the app, information associated with embedded content, such as hot-spots, Internet links, hover-over elements, etc. In an embodiment, a user utilizes UI 130 to instruct PMAR program 300 to exclude one or more apps from the set of executing apps.

In step 304, PMAR program 300 determines user preferences. In one embodiment PMAR program 300 selects various user preference from user preferences 132 based on the set of executing applications. In another embodiment, PMAR program 300 can modify a selection of user preferences based on other information such as, a size associated with the area of display 122 and the sizes of respective GUI areas of identified set of apps, a period of time, etc. In some embodiments, PMAR program 300 can utilize differing user preferences in response determining that two or more templates of interactions are performed during a session with user device 120. In an embodiment, PMAR program 300 utilizes UI 130 to present a selection of user preferences for usage or modification.

In step 306, PMAR program 300 determines a position of a pointer related to an application on a periodic basis. PMAR program 300 may determine a pointer position based on position information of a pointer relative to one or more aspects or features of the GUI of the app, such as a boarder, a frame, a menu bar, etc. In one embodiment, PMAR program 300 determines a position of a pointer within the GUI of an app on a periodic basis defined within user preferences 132, such as a temporal interval value. In various embodiments, PMAR program 300 creates a series (e.g., an ordered set) of pointer position respectively associated with a GUI of an app from a number of determined pointer positions dictated within the determined user preferences. PMAR program 300 stores pointer positions and series of pointer positions within pointer position information 138.

In some embodiments, PMAR program 300 determines a pointer position with the GUI of an app in response to identifying an event, such as detecting when the pointer is stationary for a threshold period of time; in response to a user action, such as a content-related action, activating a context menu, executing a hot-key combination, etc.; triggering a hover-over GUI element etc. In addition, PMAR program 300 associates information related to an event with a determined pointer position, such as indicating that a position is "still" position of the pointer; identifying the hot-key combination was executed; identifying a content action performed, such as copy action; a context menu was accessed; a link was activated; content displayed by a hover-over element; etc. PMAR program 300 can map the information associated with an event to state data and/or metadata stored within application information 136.

Still referring to step 306, in another embodiment, PMAR program 300 further associates a series of pointer positions with a template of interactions. For example, if app 125-3 is common to two templates of interactions, then PMAR program 300 generates a series of pointer positions associated with each template of interactions. In other embodiments, if PMAR program 300 determines that the pointer enters or is positioned within a GUI of an app not associated with a template of interactions, then PMAR program 300 does not determine and record the position of the pointer. PMAR program 300 may flag the app for a later analysis by PMAR training program 200 to determine whether a user is generating a new template of interactions.

In step 308, PMAR program 300 updates a series of pointer positions related to the application. In one embodiment, PMAR program 300 utilizes one or more user preferences to determine the size (e.g., number of pointer positions) within a series of pointer positions and a number of points to update within a series of pointer positions. In some embodiments, PMAR program 300 utilizes a first-in first-out (FIFO) strategy to update (e.g., replace) one or more pointer positions of a series of pointer positions based on an identified user preference. In another embodiment, responsive to PMAR program 300 restoring a pointer position within a previously utilized application (in step 314), PMAR program 300 deletes the previous series of pointer positions and begins generating a new series of pointer positions.

In a further embodiment, responsive to determining that state data change affects one or more apps, PMAR program 300 calculates another series of pointer positions (e.g., compensated positions) for an app from a series of pointer positions stored in pointer position information 138 and based on the change of state data associate with an affected app, such as change in a size of a GUI, a zoom change, etc.

In decision step 309, PMAR program 300 determines whether the pointer remains within the GUI of the application. In one embodiment, PMAR program 300 determines that pointer remains within the GUI of the current app based on determining that the position of the pointer is internal to the boundaries of GUI of the current app. In another embodiment, PMAR program 300 determines that pointer does not remain within the GUI of the current app based on determining that the pointer exits a boundary of GUI of the current app or is detected within the GUI of the OS of user device 120.

In some embodiments, PMAR program 300 determines that that pointer does not remain within the GUI of the current app based on determining that a user executes a hot-key combination that accesses (e.g., switches to) a related app (e.g., an app of a group of apps utilized during a template of interactions). In other embodiments, PMAR program 300 determines that that pointer does not remain within the sub-GUI or WUI of the current app based identify a change in state data or metadata, such as a different tab within the same web browser.

Responsive to determining that the pointer remains within the GUI of the application (Yes branch, decision step 309), PMAR program 300 loops to step 306 to determine one or more other positions of the pointer within the current (i.e., same) app.

Referring to decision step 309, responsive to determining that the pointer does not remain within the GUI of the application (No branch, decision step 309), PMAR program 300 determines a position corresponding to the pointer (step 310).

In step 310, PMAR program 300 determines a position corresponding to the pointer. In one embodiment, PMAR program 300 determines a position corresponding to the pointer and a direction of movement based on tracking the pointer within the OS GUI of user device 120. Based on mapping the locations of the app GUIs within the OS GUI, PMAR program 300 can identify the app that the pointer is moving towards.

In another embodiment, PMAR program 300 determines that position corresponding to the pointer is within a related app based on determining that a user executed a hot-key combination to access the related app. In one scenario, if PMAR program 300 determines that the related app was not previously utilized by a user during the current session with user device 120, then PMAR program 300 skips to step 312 to monitor the activity associated with the related application. In another scenario, if PMAR program 300 determines that the related app was previously utilized by a user during the current session with user device 120, then PMAR program 300 skips to step 314 to restore the pointer to a position within the previously utilized related app. Alternatively, if PMAR program 300 determines that the hot-key combination executed by the user accesses an app that is not associated with the current template of interactions, then PMAR program 300 skips to step 315.

In decision step 311, PMAR program 300 determines whether the pointer moves toward a GUI of a related application. In one embodiment, PMAR program 300 utilizes the pointer position and movement information determined in step 310 and state data, such as locations of app GUIs and a set of executing apps, to determine the app the that the user is moving the pointer towards. In one scenario, PMAR program 300 determines that the user moves toward a related app based on determining that the pointer is moving towards an app associated with the current template of interactions (e.g., a related app) that a user is executing. In another scenario, PMAR program 300 determines that the pointer moves towards an app that is not associated with the current template of interactions.

Responsive to determining that the pointer moves towards a related application (Yes, branch, decision step 311), PMAR program 300 monitors activity associated with the related application (step 312).

In step 312, PMAR program 300 monitors activity associated with the related application. In an embodiment, PMAR program 300 monitors activity associated with the related application by executing parallel instances of step 306, step 308, decision step 309, step 310, and/or decision step 311. In various embodiments, PMAR program 300 uses the information obtained within step 312 to create a series of pointer position and determine one or more potential pointer restore positions for the related app.

In some embodiments, PMAR program 300 identifies the next app utilized based on the information derived from the activity monitored during step 312. In one scenario, PMAR program 300 determines that after utilizing one app of a group of related apps that the user resumes utilizing a prior app of the group of related apps, where the prior app is associated with a series of pointer positions (e.g., one or more potential pointer restore positions). In another scenario, PMAR program 300 determines that the user utilizes a different related app that was not previously utilized (e.g., lacks a potential pointer restore position). In some scenarios, PMAR program 300 determines that the user resumes utilizing a related app that is excluded from pointer position monitoring (e.g., lacks a potential pointer restore position) based on a user preference or an indication within a template of interactions.

In decision step 313, PMAR program 300 determines whether to restore the pointer to a position within a related application. In one embodiment, PMAR program 300 determines to restore the pointer to a position within a related app of a group of apps (e.g., apps associated with a template of interactions) based on determining that the user resumes utilizing an app associated with one or more potential pointer restore positions. In other embodiments, PMAR program 300 determines not to restore the pointer position within a related app (e.g., the next app utilized) in response to determining that related app lacks a potential pointer restore position.

Responsive to determining to restore the pointer to a position within a related application (Yes branch, decision step 313), PMAR program 300 restores the pointer to a position within a previously utilizes application (step 314).

In step 314, PMAR program 300 restores the pointer to a position within a previously utilized application. PMAR program 300 may utilize one or more rules of user preferences 132 to affect a restore position of a pointer within and app (e.g., app GUI). In one embodiment, PMAR program 300 restores the pointer position to the last position of the series of pointer positions associated with the app that the user resumes utilizing, now the current app. In another embodiment, PMAR program 300 modifies the position that the pointer is restored to based on the event associated with the pointer position. For example, if the event was pasting content, then PMAR program 300 determines a restore position for the pointer after the pasted content as opposed to the pointer position where the content was inserted.

In some embodiments, PMAR program 300 selects a pointer restore position from a series of pointer positions that is different from a position associated with event. For example, PMAR program 300 selects a pointer restore position closer to areas within the GUI where the user performed one or more actions as opposed to an app swap event (e.g., hot-key combination execution). In a further embodiment, if PMAR program 300 determines that a state data change affects the current app, the PMAR program 300 determines one or more compensated positions to use as the restore position of the pointer. In an embodiment, PMAR program 300 can also retrigger an invent that is related to a restore position. In some example, PMAR program 300 can restore the pointer to a hover-over location and trigger the presentation of information associated with a hover-over location. In another example, if PMAR program 300 determines that content is stored in the clipboard of the OS, and action previously performed at a pointer position was a paste action, then PMAR program 300 can automatically paste the content in transit at the pointer restore location.

Referring to decision step 311, responsive to determining that the pointer does not move towards an GUI of a related application (No branch, decision step 311), PMAR program monitors activity associated with the pointer (step 315).

In step 315, PMAR program 300 monitors activity associated with the pointer. In one embodiment, if PMAR program 300 determines that the pointer activity indicates movement traversing a GUI of an unrelated app that is not included within a template of interactions without the user utilizing the app, then PMAR program 300 returns to step 310. In another embodiment, if PMAR program 300 determines that the pointer enters a GUI of an app that is associated with a different template of interactions and the user begins interfacing with the app, then another instance of PMAR program 300 begins executing at step 304 and includes the current app.

In some scenarios, user preferences 132 dictate that if PMAR program 300 determines that the pointer enters a GUI of an app that is not associated with the group of related apps (e.g., apps associated with a template of interactions), then PMAR program 300 ignores user interactions with the unassociated app. Subsequently, PMAR program 300 resumes executing in response to determining that the pointer is detected within another app. Alternatively, user preferences 132 may dictate that PMAR program 300 executes an instance of PMAR training program 200 to determine whether a user initiates a new template of interactions, in response to determining that the user begins interfacing with not associated a template of interactions.

Referring to decision step 313, responsive to determining not to restore the pointer within a related application (No branch, decision step 313), PMAR program monitors activity associated with the pointer (step 315).

Referring to step 315, in another scenario PMAR program 300 monitors the activity of the pointer to within the current app until the pointer exits the current app or the user executes a hot-key combination to access another app. Subsequently, PMAR program 300 resumes executing at step 310. Alternatively, PMAR program 300 may execute an instance of PMAR training program 200 to determine whether a user adds or modifies elements to the template of interactions that PMAR program 300 is monitoring.

Figure 4:
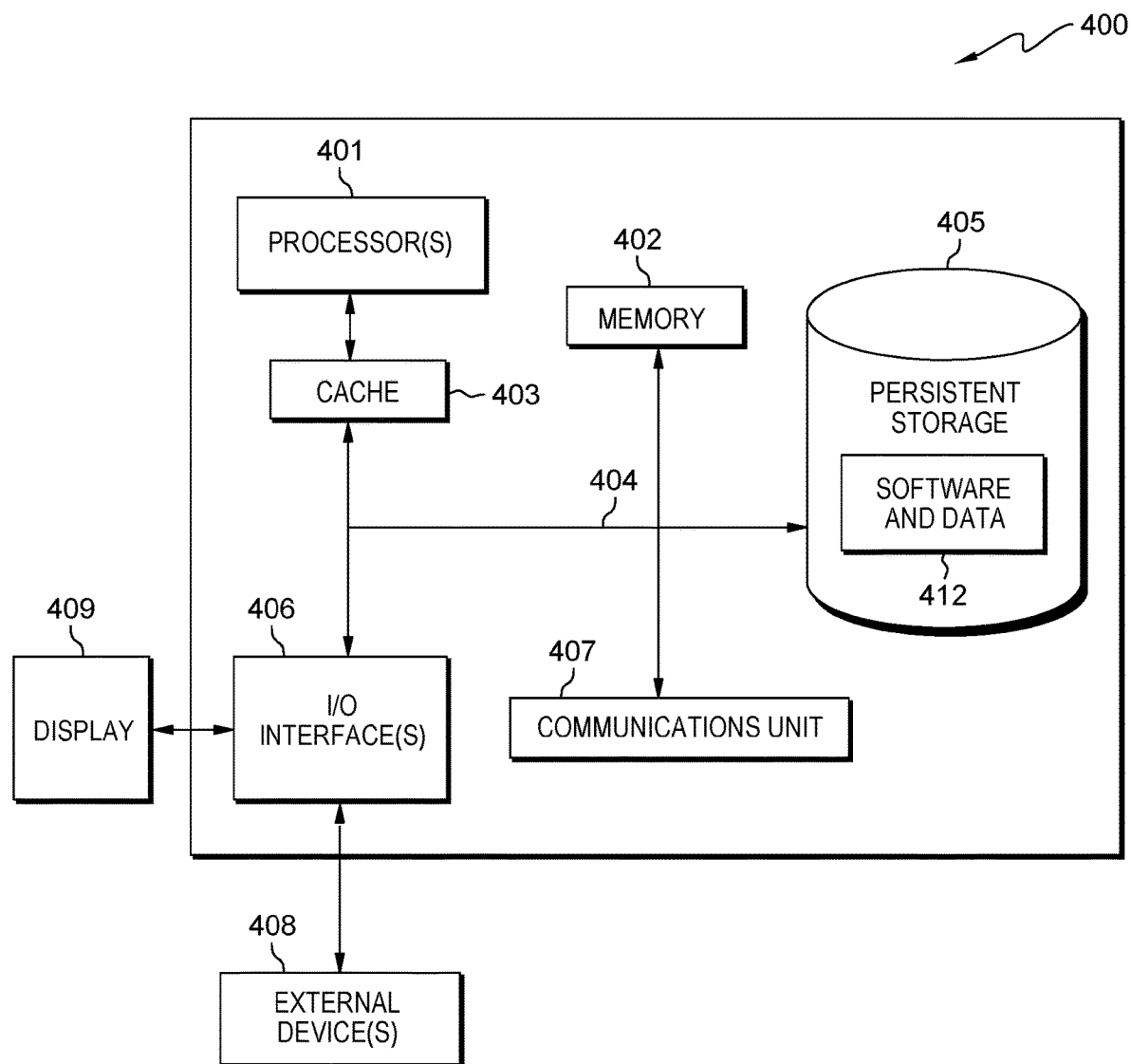
FIG. 4 is a block diagram of components of a computer, in accordance with an embodiment of the present invention.

FIG. 4 depicts computer system 400, which is representative of one or more portions of device computing environment 100. Computer system 400 is an example of a system that includes software and data 412. Computer system 400 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random-access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 are stored in persistent storage 405 for access and/or execution by one or more of the respective processor(s) 401 via cache 403 and one or more memories of memory 402. With respect to user device 120 software and data 412 includes apps 125-1, app 125-2, app 125-3 through app 125-N, user interface 130, user preferences 132, templates of interactions 134, application information 136, pointer position information 138, PMAR training program 200, and PMAR program 300, and other programs and data (not shown).

Communications unit 407, in these examples, provides for communications with other data processing systems or devices, including resources and program executing on the Internet (not shown). In these examples, communications unit 407 includes one or more network interface cards. Communications unit 407 may provide communications, through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409, which is representative of display 140.

Display 409 provides a mechanism to display data to a user and may be, for example, a computer monitor. In an embodiment display 409 is representative of display 140. Display 409 can also function as a touch screen, such as the display of a tablet computer or a smartphone. Alternatively, display 409 displays information to a user based on a projection technology, such as virtual retinal display, a virtual display, etc. In various embodiments, display 409 is utilized to generate and receive input from a graphical or a virtual instance of an input device.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a sequence of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    identifying, by one or more computer processors, a set of applications executing on a computing device of a user;
    determining, by one or more computer processors, a series of pointer positions within a graphical user interface (GUI) of a first application of the set of executing applications in response to the user interfacing with the first application;
    determining, by one or more computer processors, that the user pauses interfacing with a second application and resumes accessing the first application;
    determining, by one or more computer processors, a pointer position within the GUI of the first application on a periodic basis from among the series of pointer positions respectively associated with the GUI of the first application; and
    responsive to determining that the user resumes accessing the first application, positioning, by one or more computer processors, the pointer within the GUI of the first application at the determined pointer position, wherein the determined pointer position is a stationary position within a threshold area of the GUI of the first application where the pointer remains for a duration of time greater than a dwell time value.

2. The method of claim 1, wherein determining the series of pointer positions within the GUI of the application further comprises:
    storing, by one or more processors, as an ordered set, a dictated number of determined pointer positions corresponding to the pointer.

3. The method of claim 1, wherein an event that occurs within the GUI is selected from the group consisting of triggering a hover-over element, executing a user-defined hot-key combination, executing a content-related action, and accessing a context menu.

4. The method of claim 1, wherein determining that the user pauses interfacing with the second application and resumes accessing the first application further comprises:
   identifying, by one or more computer processors, an event that indicates that the pointer exits the GUI of the second application;
   determining, by one or more computer processors, that a motion corresponding to the pointer indicates that the pointer moves toward the GUI of the first application; and
   determining, by one or more computer processors, whether the pointer moves within a proximity threshold of the GUI of the first application.

5. The method of claim 4, further comprising:
   responsive to determining that that the pointer moves within a proximity threshold of the GUI of the first application, accessing, by one or more computer processors, the first application.

6. The method of claim 1, wherein determining that the user pauses interfacing with the second application and resumes accessing the first application further comprises:
   determining, by one or more computer processors, that the use executes a hot-key combination that dictates accessing the first application.

7. The method of claim 1, further comprising:
   determining, by one or more computer processors, an event associated with a change of position of the pointer.

8. A computer program product comprising:
   one or more computer readable storage media and program instructions stored on the one or more computer readable storage media, the stored program instructions readable/executable by one or more computer processors, the stored program instructions comprising:
      program instructions to identify a set of applications executing on a computing device of a user;
      program instructions to determine a series of pointer positions within a graphical user interface (GUI) of a first application of the set of executing applications in response to the user interfacing with the first application;
      program instructions to determine that the user pauses interfacing with a second application and resumes accessing the first application;
      program instructions to determine a pointer position within the GUI of the first application on a periodic basis from among the series of pointer positions respectively associated with the GUI of the first application; and
      responsive to determining that the user resumes accessing the first application, program instructions to position the pointer within the GUI of the first application at the determined pointer position, wherein the determined pointer position is a stationary position within a threshold area of the GUI of the first application where the pointer remains for a duration of time greater than a dwell time value.

9. The computer program product of claim 8, wherein program instructions to determine the series of pointer positions within the GUI of the application further comprise:
   program instructions to store, as an ordered set, a dictated number of determined pointer positions corresponding to the pointer.

10. The computer program product of claim 8, wherein an event that occurs within the GUI is selected from the group consisting of triggering a hover-over element, executing a user-defined hot-key combination, executing a content-related action, and accessing a context menu.

11. The computer program product of claim 8, wherein program instructions to determine that the user pauses interfacing with the second application and resumes accessing the first application further comprise:
   program instructions to identifying another event that indicates that the pointer exits the GUI of the second application;
   program instructions to determine that a motion corresponding to the pointer indicates that the pointer moves toward the GUI of the first application; and
   program instruction to determine that the pointer moves within a proximity threshold of the GUI of the first application.

12. The computer program product of claim 11, the stored program instructions further comprising:
   responsive to determining that that the pointer moves within a proximity threshold of the GUI of the first application, program instructions to access the first application.

13. The computer program product of claim 8, wherein program instructions to determine that the user pauses interfacing with the second application and resumes accessing the first application further comprise:
   program instructions to determine that the use executes a hot-key combination that dictates accessing the first application.

14. The computer program product of claim 8, the stored program instructions further comprising:
   program instructions to determine an event associated with a change of position of the pointer.

15. A computer system comprising:
   one or more computer processors;
   one or more computer readable storage media; and
   program instructions stored on the computer readable storage media for execution by at least one of the one or more computer processors, the stored program instructions comprising:
      program instructions to identify a set of applications executing on a computing device of a user;
      program instructions to determine a series of pointer positions within a graphical user interface (GUI) of a first application of the set of executing applications in response to the user interfacing with the first application;
      program instructions to determine that the user pauses interfacing with a second application and resumes accessing the first application;
      program instructions to determine a pointer position within the GUI of the first application on a periodic basis from among the series of pointer positions respectively associated with the GUI of the first application; and
      responsive to determining that the user resumes accessing the first application, program instructions to position the pointer within the GUI of the first application at the determined pointer position, wherein the determined pointer position is a stationary position within a threshold area of the GUI of the first application where the pointer remains for a duration of time greater than a dwell time value.

16. The computer system of claim 15, wherein program instructions to determine the series of pointer positions within the GUI of the application further comprise:
   program instructions to store, as an ordered set, a dictated number of determined pointer positions corresponding to the pointer.

17. The computer system of claim 15, wherein an event that occurs within the GUI is selected from the group consisting of triggering a hover-over element, executing a user-defined hot-key combination, executing a content-related action, and accessing a context menu.

18. The computer system of claim 15, wherein program instructions to determine that the user pauses interfacing with the second application and resumes accessing the first application further comprise:
   program instructions to identifying another event that indicates that the pointer exits the GUI of the second application;
   program instructions to determine that a motion corresponding to the pointer indicates that the pointer moves toward the GUI of the first application; and
   program instruction to determine that the pointer moves within a proximity threshold of the GUI of the first application.

19. The computer system of claim 18, the stored program instructions further comprising:
   responsive to determining that that the pointer moves within a proximity threshold of the GUI of the first application, program instructions to access the first application.

20. The computer system of claim 15, the stored program instructions further comprising:
   program instructions to determine an event associated with a change of position of the pointer.

* * * * *